(12) United States Patent
Davila

(10) Patent No.: US 6,299,451 B1
(45) Date of Patent: Oct. 9, 2001

(54) TIME TEACHING GLOBE

(75) Inventor: Robert Davila, Bellmore, NY (US)

(73) Assignee: Natural Science Industries, LLP, West Hempstead, NY (US)

( * ) Notice: Subject to any disclaimer, the term of this patent is extended or adjusted under 35 U.S.C. 154(b) by 0 days.

(21) Appl. No.: 09/596,621

(22) Filed: Jun. 19, 2000

(51) Int. Cl.⁷ .................................................. G09B 27/06
(52) U.S. Cl. ...................... 434/142; 434/143; 434/145; 434/288
(58) Field of Search .................................. 434/142, 143, 434/304, 145, 288; 368/24, 23; 968/169

(56) References Cited

U.S. PATENT DOCUMENTS

| | | | |
|---|---|---|---|
| 47,584 | * | 5/1865 | Timby ..................................... 368/23 |
| 220,036 | * | 9/1879 | Sarratt ..................................... 368/17 |
| 500,659 | * | 7/1893 | Jourdan ................................... 368/24 |
| 1,040,310 | * | 10/1912 | Hall ........................................ 368/23 |
| 1,959,601 | * | 5/1934 | Schulse ................................... 368/24 |
| 2,055,969 | * | 9/1936 | Farreny ................................... 368/23 |
| 2,068,418 | * | 1/1937 | Kyack ................................... 434/143 |
| 2,247,394 | * | 7/1941 | Mills ....................................... 368/23 |
| 2,253,747 | * | 8/1941 | Alland .................................... 368/23 |
| 2,785,528 | * | 3/1957 | Kernick .................................. 368/24 |
| 3,049,863 | * | 8/1962 | Ranney ................................... 368/24 |
| 3,197,893 | * | 8/1965 | Mariotti ............................... 434/143 |
| 3,370,415 | * | 2/1968 | McIlvane ................................ 368/24 |
| 3,611,704 | * | 10/1971 | Guintos .................................. 368/23 |
| 3,827,233 | * | 8/1974 | Villar Eschevarria ................. 368/23 |
| 4,056,927 | * | 11/1977 | Wilson .................................... 368/24 |
| 4,102,121 | * | 7/1978 | Veazey .................................... 368/24 |
| 4,308,604 | * | 12/1981 | Graham .................................. 368/23 |
| 4,936,779 | * | 6/1990 | Carlson ................................. 434/143 |
| 4,938,695 | * | 7/1990 | Kinner .................................. 434/131 |
| 4,985,876 | * | 1/1991 | Vazquez ................................. 368/23 |
| 5,132,943 | * | 7/1992 | Davies ................................... 368/21 |
| 5,280,458 | | 1/1994 | Scott ...................................... 368/24 |
| 5,545,041 | | 8/1996 | Tsuzuki ................................ 434/136 |

* cited by examiner

Primary Examiner—Jacob K. Ackun, Jr.
Assistant Examiner—K. Fernstrom
(74) Attorney, Agent, or Firm—Schweitzer Cornman Gross & Bondell LLP

(57) ABSTRACT

A model globe for illustrating time relationships and related concepts includes a global representation of the earth rotatable about an axis simulating the earth's axis of rotation. A cursor assembly is independently rotatable about the axis, and includes a cursor which may be positioned at a desired place on the earth as represented on the model globe. An indicator is coupled to the cursor assembly and displays the rotations position of the cursor about the simulated axis of rotation. The indicator is preferably in the form of a clock, whereby the time over a 24-hour period corresponding to a revolution of the earth about its axis is displayed to correspond to the position of the cursor. The cursor assembly may be locked to the globe so that they may be rotated about the axis in unison, whereby the indicator depicts the passage of time along the longitude of the cursor as the globe rotates. An internal illuminator may be provided to illuminate the globe to simulate the illumination of the earth by the sun.

12 Claims, 7 Drawing Sheets

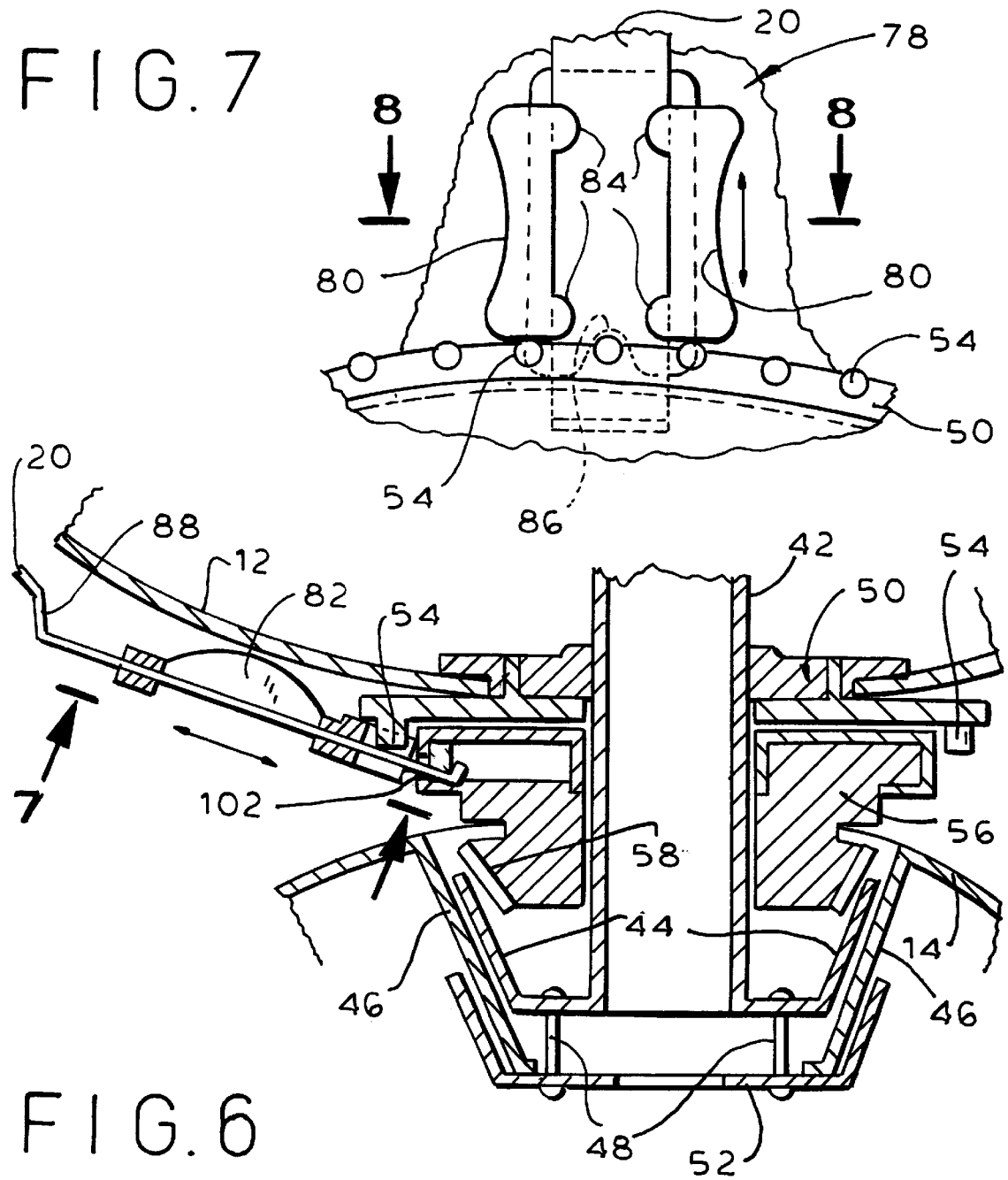

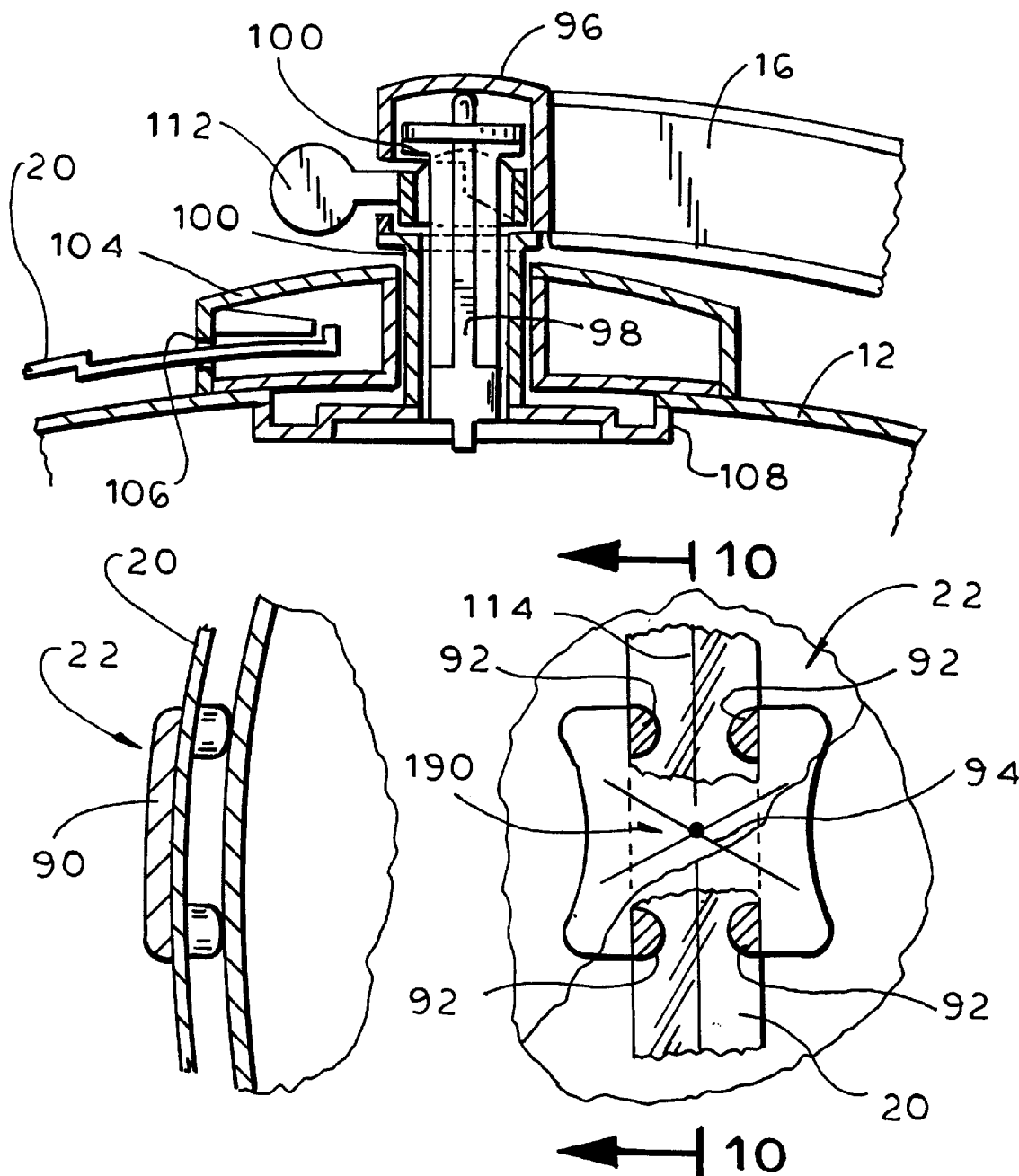

TIME TEACHING GLOBE

BACKGROUND OF THE INVENTION

The measurement of time is a concept which, while perhaps grasped in the abstract, may be difficult to understand in a more rigorous manner. It is sometimes difficult, for example, for a child to recognize and appreciate that, when it is the middle of the day in New York, it is the middle of the night in China. Further, when a clock indicates 12 noon in New York, why do clocks in Los Angeles say it is 9:00 in the morning? The teaching of the foregoing and related concepts can be facilitated by a model of the earth in which the relationship between the rotation of the earth about its axis and the passage of time and the relationship of the various points on the earth with respect to both local time and to the solar day at a particular time can be depicted.

Model globes have been developed to illustrate and present the illumination of the earth by the sun. Such globes can inferentially display the relationship of clock time to rotation of the earth. Yet such globes do not sufficiently depict the relationship of local time to the earth's rotation, or illustrate how local time varies across the world.

It is accordingly a purpose of the present invention to provide a model globe in which a representation of the illumination of the earth by the sun can be presented.

A further purpose of the present invention is to provide a model globe of the earth in which the rotation of the earth about its axis, and the effect of such rotation upon the illumination of the earth's surface by the sun can be illustrated.

Still a further purpose of the present invention is to provide a model globe in which relative clock time for different locations on the globe can be compared and presented.

Another purpose of the present invention is to provide a model globe in which local clock time for a chosen location can be displayed and varied in conjunction with the rotation of the globe about its axis.

Yet another purpose of the present invention is to provide a model globe in conjunction with a clock face which has a hand which rotates about the clock face to depict the passage of time in association with globe rotation.

BRIEF DESCRIPTION OF THE INVENTION

In accordance with the foregoing and other objects and purposes, a model globe constructed in accordance with the present invention comprises a translucent sphere on the surface of which major characteristics of the earth are presented mounted to a base in a manner which supports the globe upon an axis representing the earth's rotational axis and allows the globe to rotate thereabout. Internal illumination means are provided to illuminate a hemisphere of the globe to simulate solar illumination of the earth. A cursor device is mounted to the base and is independently rotatable upon the axis about the globe. An indicator is operatively connected to the cursor, such that, as the cursor is rotated with respect to the globe's surface, the indicator, which may be in the form of a clock, indicates the relative time along a longitude represented by the position of the cursor. By independently rotating the globe and cursor, a particular time associated with the cursor position can be associated with any particular location on the globe. Subsequent rotation of the cursor with the globe stationary allows relative time at different points across the globe to be shown on the clock.

Means are provided to engage the cursor with the globe to allow them to rotate together. When so connected, rotation of the cursor and globe depicts the passage of time for the geographic location indicated by the cursor as the globe rotates about its axis. At the same time, the internal illumination means laminating a hemisphere of the globe depicts the passage of the location from day into night concurrent with the passage of time as shown by the clock means. The invention thus may serve as a teaching tool for the concept of time and relative time, and further allows the user to understand differences in local time based upon the relative location of points upon the earth.

BRIEF DESCRIPTION OF THE DRAWINGS

A filler understanding of the present invention will be established upon consideration of the following detailed description of a preferred, but nonetheless illustrative embodiment of the invention, when reviewed in conjunction with the annexed drawings, wherein:

FIG. 6 is a detail sectional view depicting the mounting of the globe and the lower portion of the cursor assembly to the base;

FIG. 7 is a detail view of the locking portion of the cursor assembly taken along line 7—7 of FIG. 6;

FIG. 8 is a section view taken along line 8—8 of FIG. 7;

FIG. 9 is an elevation view detailing the mounting of the cursor slide upon the cursor assembly;

FIG. 10 is a section view taken along line 10—10 of FIG. 9; and

FIG. 11 is a detail sectional view depicting the upper mounting of the globe and cursor assembly.

DETAILED DESCRIPTION OF THE INVENTION

Figure 1:
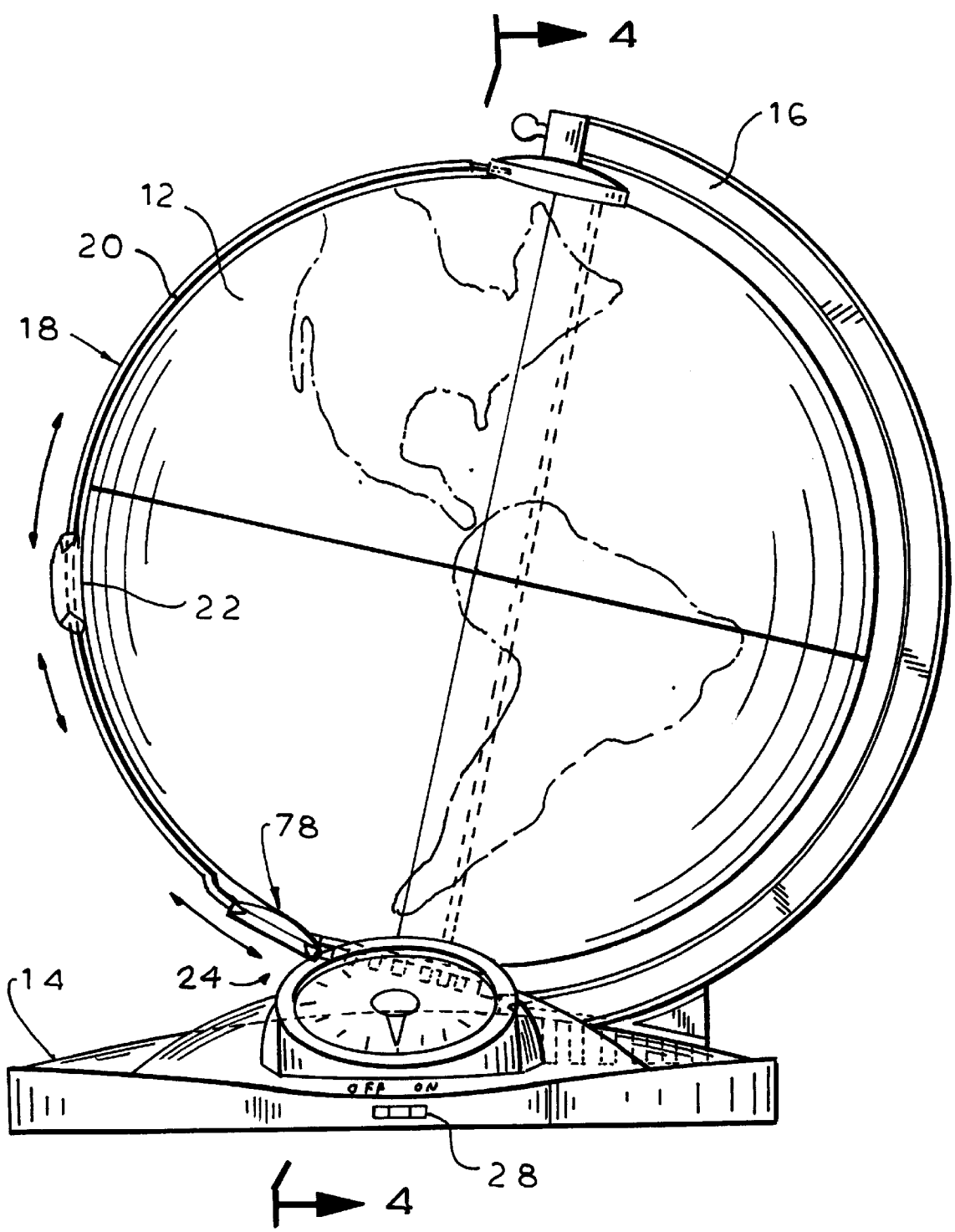
FIG. 1 is a front elevation view thereof.
Figure 2:
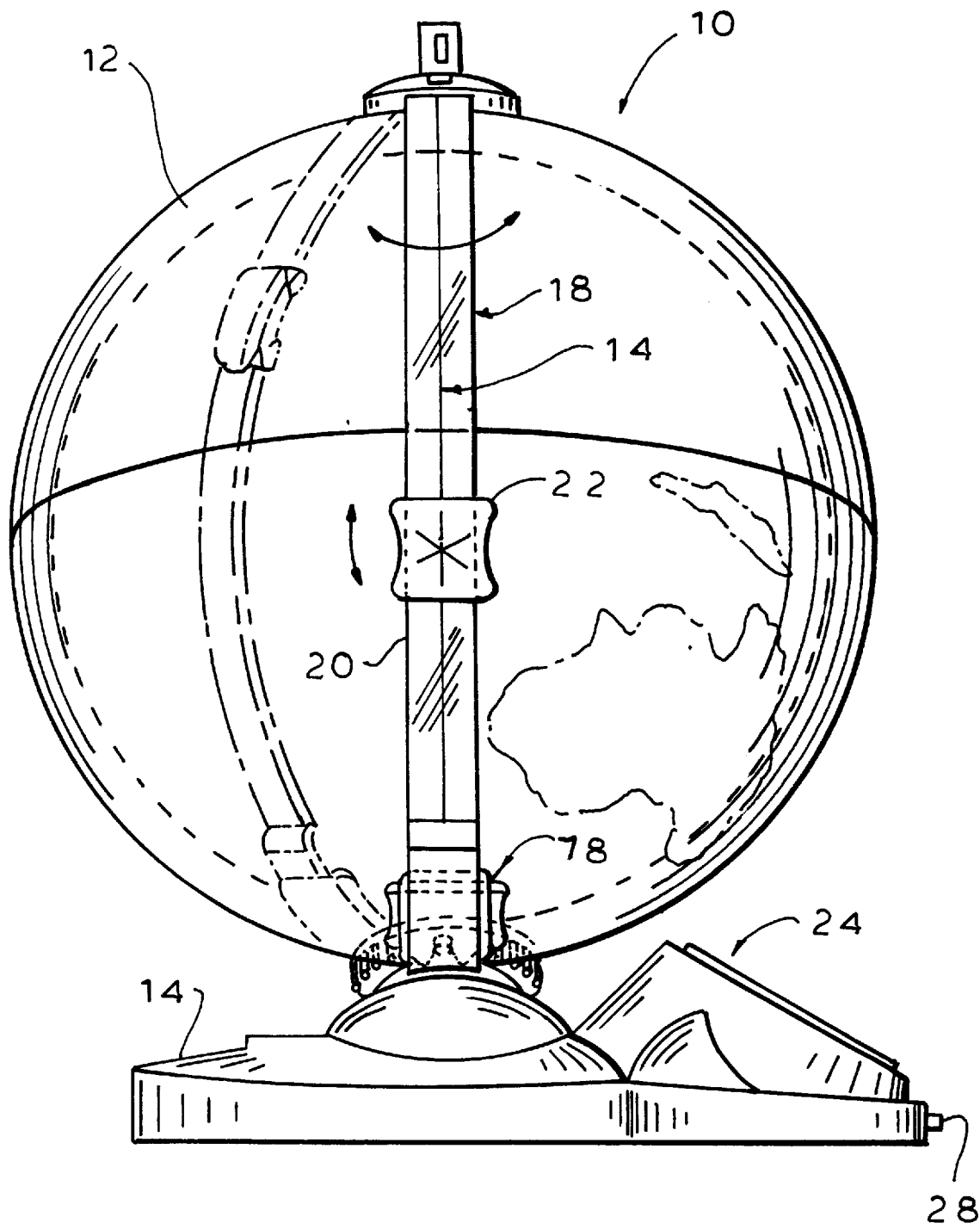
FIG. 2 is a side elevation view thereof.

Referring initially to FIGS. 1 and 2, globe apparatus 10 includes a globe 12 formed as a hollow translucent plastic having upon its surface a scale representation of the earth's surface. The globe 12 is mounted for rotation about an axis corresponding to the earth's polar rotational axis. The axis of rotation has a first lower point of support located upon base 14, and a second, upper point of support at the end of arcuate bearing arm 16, which itself is mounted to base 14. The axis of rotation may depart from the vertical to duplicate the axial tilt of the earth. Also mounted for independent rotation about the globe upon the axis of rotation is cursor assembly 18, which includes a cursor arm 20 bearing a sliding cursor 22, which is capable of being positioned along the length of the cursor arm, and a lock mechanism 78. With the lock mechanism disengaged, the cursor assembly is rotatable about the globe independently of the globe, whereby the cursor arm and cursor may be positioned to overlie and thus indicate any chosen location upon the globe. With the lock mechanism engaged, the cursor assembly and globe are interengaged to rotate together. Preferably, the cursor arm bears line indicia 114 which corresponds to a line of longitude for the earth, the sliding cursor 22 thus being movable along the axis to a chosen point of latitude along the longitude denoted by the position of the cursor arm about the circumference of the globe. Base 14 includes an indicator comprising a clock face assembly 24 having a hand 26 which rotates about the clock face to indicate a time associated with the position of the cursor arm. One full rotation of the cursor arm drives the clock hand one 360 degree rotation about the clock face. On/off switch 28 powers the internal illumination of the globe as will hereinafter be described.

Figure 4:
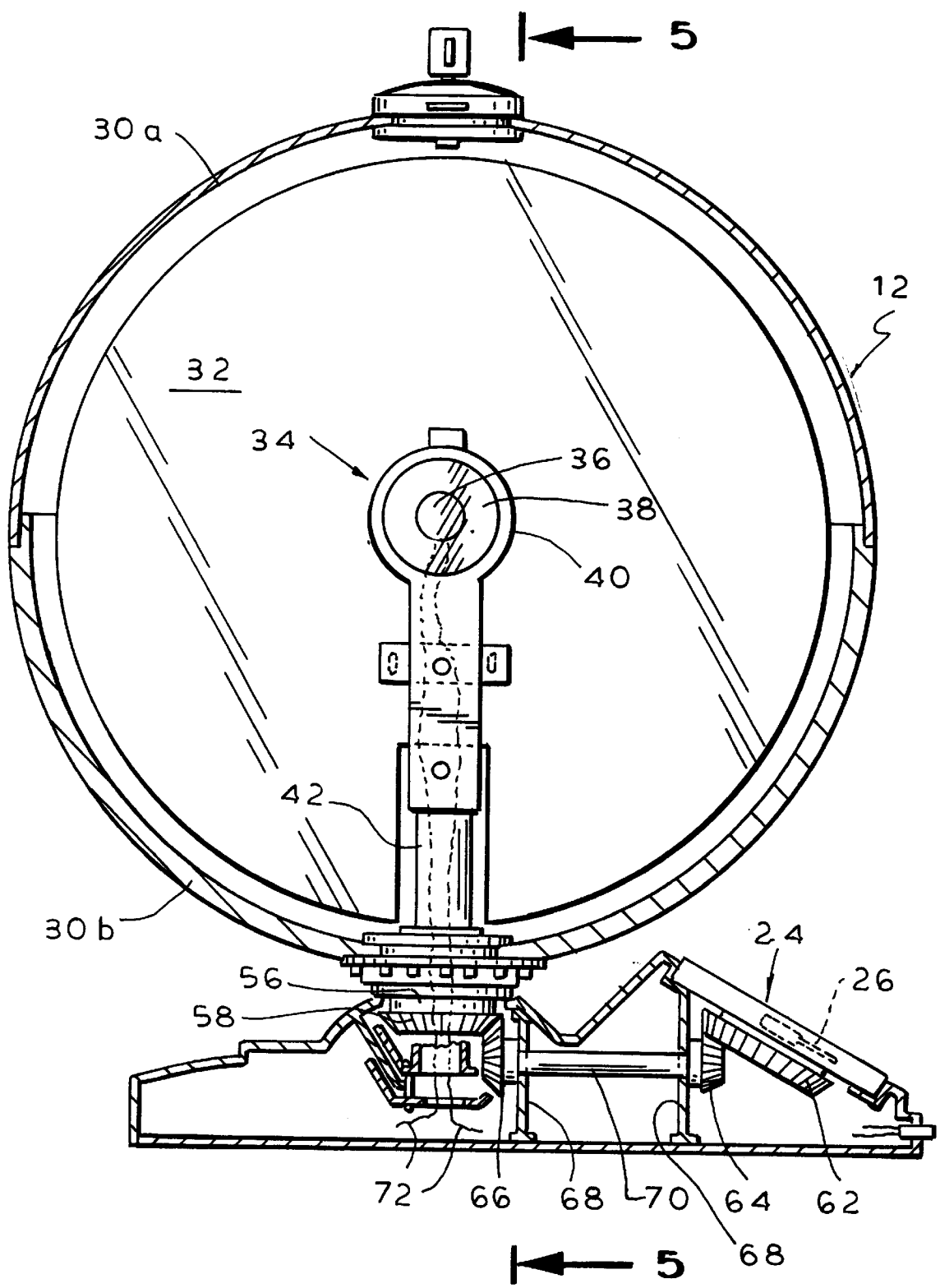
FIG. 4 is a section view taken along line 4—4 of FIG. 1.
Figure 5:
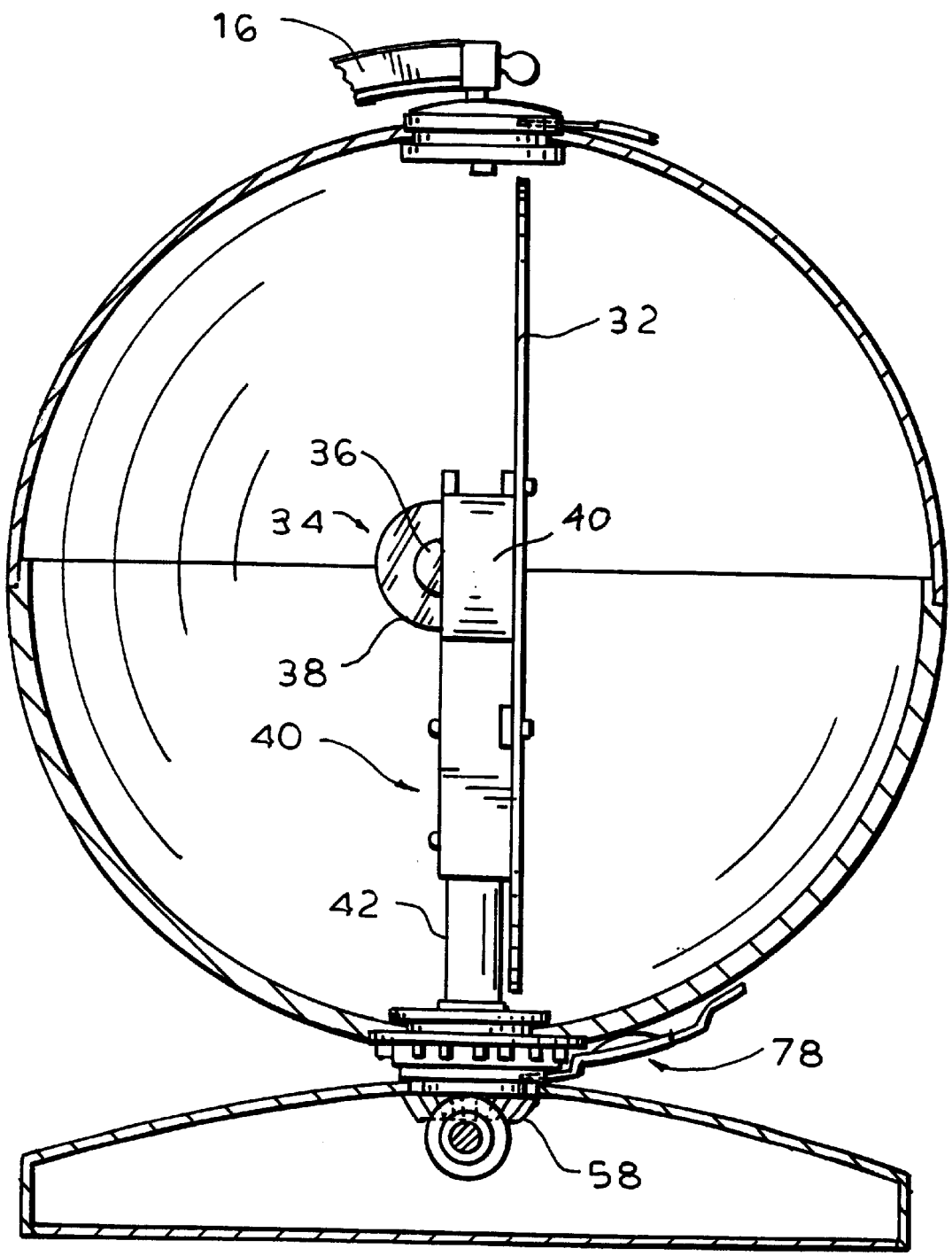
FIG. 5 is a section view taken along line 5—5 of FIG. 4.

With further reference to FIGS. 4 and 5, the globe 12 may be preferably constructed as a thin, hollow shell having upper and lower interfitting hemispheres 30*a,b*. Extending upwardly within the interior of the globe is opaque plastic circular disk 32, which divides the interior of the globe into a pair of day/night hemispheres substantially along the rotational axis for the globe. The disk is mounted to a stem 42, which also supports an illumination assembly 34 on one side of the disk. The illumination assembly includes a bulb 36 within a translucent lens 38 in holder 40, which may be constructed as part of the stem 24. Illumination of the bulb and illumination assembly simulates the illumination of one side of the earth by the sun, the disk 32 driving the globe into illuminated (day) and dark (night) portions. The stem 42 extends downwardly through the bottom of the globe and, as detailed in FIG. 6, is rigidly mounted to the base 14, terminating in a lower lipped flange portion 44 which is supported and mounted upon a mating flange structure 46 formed in the base 14. A dish-like cover 52 overlies the base flange and is joined to the lower lipped flange 44 of the stem by rivets 48, or the like, which retains the stem in position. The bottom of the stem and dish-like cover are open to allow a pair of leads running from the bulb 36 to be interconnected to other elements in the base.

The stem 42 passes through the bottom of the globe through globe bearing assembly 50, which supports the globe upon the stem and allows the globe to rotate about the stem. The globe bearing assembly 50 includes a circular array of downwardly-extending posts 54 which serve as complimentary locking means with the lock mechanism 78 on the cursor arm 20. A lower bearing ring 56 for the cursor assembly 18 is also journaled for rotation about the stem 42, allowing the cursor assembly to rotate about the stem independently of the globe. The side wall of the bearing ring is provided with a slot 102 which supports the lower end of the cursor arm 20. Gear face 58 is formed on the lower surface of the bearing ring 56, access thereto being provided by an opening in the internal base flange structure 46. The gear face 58 is utilized to convey cursor assembly rotational position information to the clock assembly 24.

Figure 3:
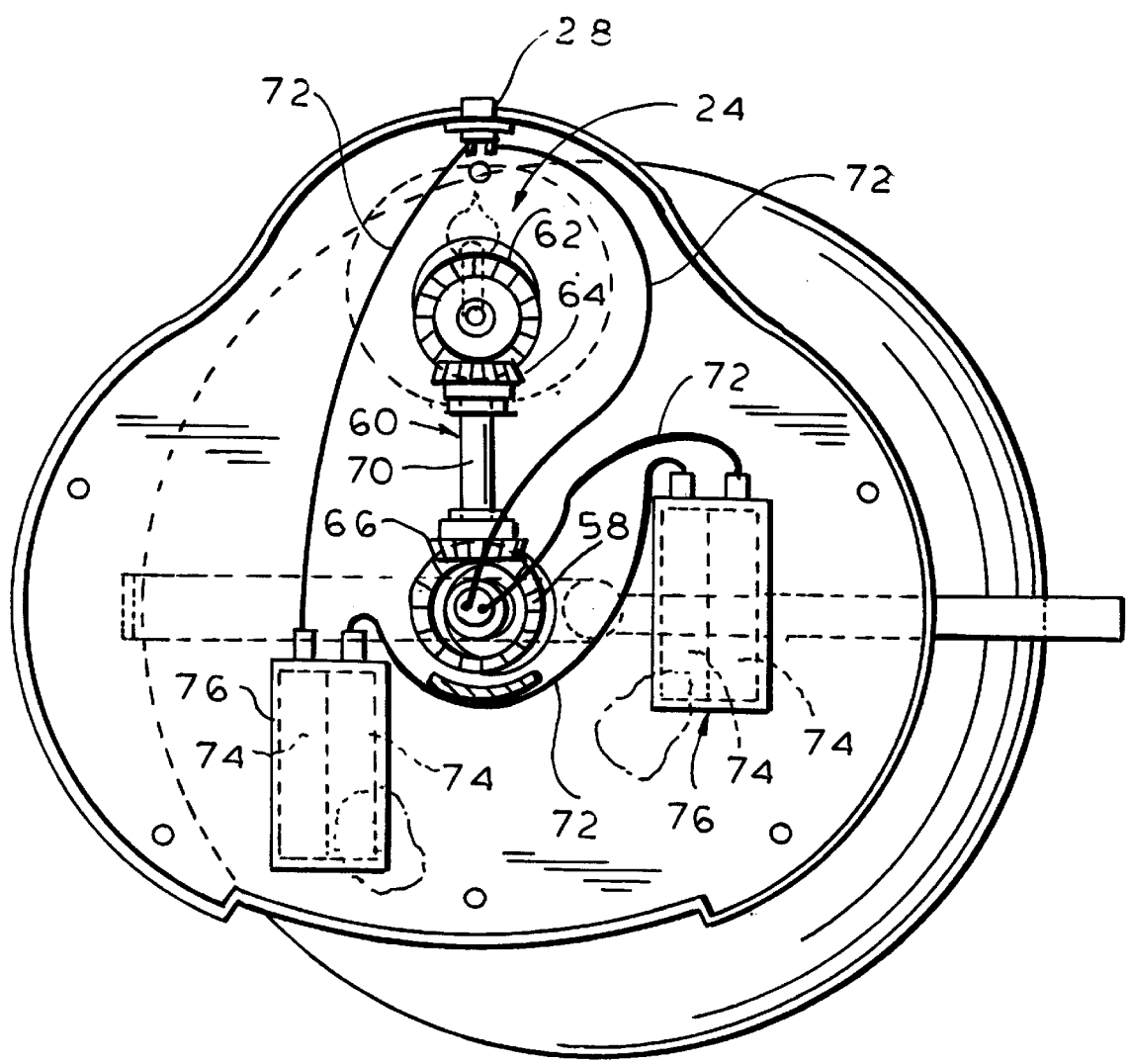
FIG. 3 is a bottom plan view, presenting the interior construction of the base.

Reverting to FIGS. 3 and 4, it can be seen that the gear face 58 of the lower cursor bearing 56 is coupled by an intermediate gear assembly 60 to the clock assembly 24. In particular, the clock hand 26 is provided with gear 62 with which bevel gear 64 of the intermediate gear assembly 60 connects. A second bevel gear 66 of the intermediate gear assembly 60 engages the gear face 58 of flange 56. The intermediate gear assembly 60 is supported within the base 14 by a pair of brackets 68. The brackets 68 may each be formed in two parts, a lower portion being molded as part of the base bottom, while an upper portion is molded as part of the base top. Semi-circular recesses in the ends of the bracket portions embrace and support the shaft 70 of the intermediate gear assembly 60 when the bottom and top of the base are assembled. As also seen in FIG. 3, the leads 72 from the bulb 36 pass through the open bottom end of the stem and are connected to a series array of four 1.5 volt batteries 74 located in pairs within molded battery holders 76. Switch 28 is also wired in series with the bulb and batteries, the switch being mounted on the base side wall for user activation.

Clock face 24 is divided into 24 equal segments whereby one revolution of the hand signifies the passage of 24 hours. Indicia on the clock face may denote day and night in 12 hour increments. The gearing between the hand and the stem and cursor assembly is chosen such that one revolution of the stem and cursor assembly drives the hand one full rotation, whereby the positioning of the cursor assembly at any longitude around the globe depicts relative time. Preferably, the cursor and clock hand are linked such that a time of 6:00 am is depicted with the cursor assembly aligned with a first edge portion of the internal disk such that as the cursor assembly traverses the illuminated hemisphere daylight hours are indicated. As the cursor are normally free to rotate with respect to the globe, the cursor can be rotated to identify a particular hour on the clock. The globe is then independently rotated to correlate a particular point on the globe with that time. When the cursor is then again moved with the globe remaining stationary, the clock face will show relative time with respect to the original time and location chosen. With the illumination means activated, the globe can be rotated to show how the division between night and day travels around the world in the course of the earth's rotation, and the cursor can be rotated to show a correlation between local time and the sun's illumination of the earth.

As a teaching tool, it is of further interest and value to display and illustrate how the passage of time at a particular point on the globe as the earth rotates. Thus, means are provided to lock the globe to the cursor assembly, allowing them to be rotated in unison. Such structure is particularly detailed in FIGS. 6 through 8. As presented therein, the cursor arm 20 is provided at its lower end with the lock mechanism 78. Lock mechanism 78 comprises a slider of generally rectangular shape mounted to the cursor arm, its lateral edges 80 being concave to facilitate gripping by the fingers of a user. As shown in FIG. 8, the slider is generally H-shape in cross-section. The legs 82 of the H are arcuate, as seen in FIG. 6, and bear against the globe surface in a gentle friction fit. A pair of inwardly-directed upper and lower flanges 84, spaced from the main body portion of the slider, lies below the cursor arm to overlie and embrace the top surface of the cursor arm to maintain the slider thereon. The lower edge of the slider is provided with a notch portion 86 which, when the slider is in a lower position on the cursor arm, engages one of the posts 54 on the globe bearing 50. In the engaged position, rotation of the cursor arm allows the globe to rotate therewith. The cursor arm 20 may be provided with a bend 88 to define an upper limit of travel for the slider.

The cursor arm 20 also supports main sliding cursor 22 thereon as detailed in FIGS. 9 and 10. Cursor 22 has a main clear body portion 90 which overlies and rides along the cursor arm, and a pair of inwardly-directed rear flanges 92 which both embrace the cursor arm and contact the globe surface to provide a frictional fit thereagainst. A cross-hair arrangement 94 may be provided to allow the cursor to be more easily aligned with a chosen spot on the globe surface.

The upper support for the globe and the cursor arm 20 is depicted in FIG. 11. As shown therein, the bearing arm 16 terminates in a generally cylindrical cap 96 which serves as an upper support and bearing for both the cursor arm 20 and the globe 12. A lock mechanism comprises shaft 98 having a top end which bears against the inner surface of the cap, the shaft extending downwardly within and supporting a cylindrical bearing 100. Cursor arm cap 104 is in turn journaled upon bearing 100 for the cursor arm, the top end of the cursor arm being mounted within a slot 106 in the side wall of the cap. The lower end of the shaft 98 fits within a bore in an upper bearing plate for the globe 12, allowing the globe and bearing plate to rotate about the shaft. The shaft 98 also has an inclined peripheral flange 110 at its upper end which serves as a cam plate for a rotatable cam lever 112. Rotation of the cam lever to bear against the cam flange drives the shaft upwardly and the bearing 100 downwardly, separating the bearing arm 16 and the globe 12, and allowing the bottom end of the shaft to disengage from the globe. The bearing arm 16, which may be attached to the base assembly through a removable joint, can then be removed from the base assembly.

I claim:

1. A model globe, comprising:

a hollow sphere representing the earth;

axis means supporting the sphere for manual rotation about an axis simulating the earth's rotational axis;

a cursor assembly independently supported by said axis means for independent manual rotation and positioning about the simulated earth's axis; and clock means coupled to the cursor assembly and driven by the rotation of the cursor assembly for indicating the relative position of the cursor assembly about the simulated earth's axis.

2. The model globe of claim 1 further comprising illumination means for illuminating the sphere in a manner simulating the illumination of the earth by a sun.

3. The model globe of claim 1, wherein said clock means comprise a clock face and a movable hand.

4. The model globe of claim 3, wherein said clock hand is coupled to said cursor assembly for rotation about said clock face.

5. The model globe of claim 4, wherein said clock face includes indicia dividing the clock face into 24 hour-denoting segments.

6. The model globe of claim 4, wherein said clock hand is coupled to said cursor assembly by a gear train.

7. The model globe of claim 1 further comprising means for locking said cursor assembly to said sphere for conjoint rotation about the simulated earth's axis.

8. The model globe of claim 7, wherein said locking means comprise a slider located on said cursor assembly selectively engageable with a selected one of a series of posts mounted to said sphere.

9. The model globe of claim 7, wherein said cursor assembly comprises a cursor arm, and cursor mounted for sliding positioning on the cursor arm, said locking means slider being mounted on a lower portion of the cursor arm.

10. A model globe, comprising:

a base supporting a stem representing the earth's rotational axis;

a sphere representing the earth and a cursor assembly having a cursor portion movable thereon for manual positioning with respect to a chosen position on the sphere, each of said sphere and cursor assembly being mounted for independent manual rotation about the represented earth's axis upon said stem; and an indicator coupled to said cursor assembly and driven by the rotation of the cursor assembly for indicating the relative position of the cursor about the represented earth's axis.

11. The model globe of claim 10 further including illumination means mounted to said stem internal to said sphere for illuminating a hemisphere of the sphere in a manner representing illumination of the earth by the sun.

12. The model globe of claim 10, wherein the indicator is a clock.

* * * * *